UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DERIVATIVES OF ACIDYLAMINOOXYARSENOBENZENE AND PROCESS OF MAKING SAME.

1,077,462.     Specification of Letters Patent.     Patented Nov. 4, 1913.

No Drawing.     Application filed December 3, 1912. Serial No. 734,772.

*To all whom it may concern:*

Be it known that we, PAUL EHRLICH, M. D., professor of medicine, and ALFRED BERTHEIM, Ph. D., chemist, citizens of the Empire of Germany, residing at Frankfort-on-the-Main, Germany, have invented certain new and useful Improvements in Derivatives of Acidylaminooxyarsenobenzene and Processes of Making Same, of which the following is a specification.

We have found that the acidyl derivatives of the aminooxyarylarsinic acids, *i. e.*, those derivatives of these acids which contain the radical of an acid linked to the nitrogen, such for instance as:

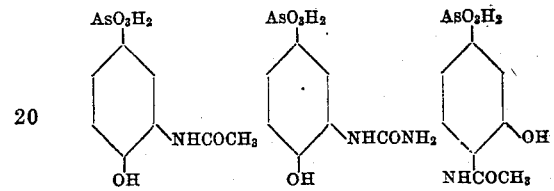

may be transformed, without splitting off the acidyl residue, into the corresponding arseno compounds, *i. e.*, the acidylaminooxyarsenobenzene derivatives, by treatment with strong reducing agents. These new products contain a radical of the formula:

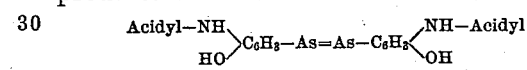

They are yellow powders, insoluble in ether, benzene and diluted acids, soluble in acetone, alcohol, alkalis and sodium carbonate, splitting up, when heated with diluted acids, with production of diaminodioxyarsenobenzenes. These acidylaminooxyarsenobenzene derivatives are compounds which show spirillocide action like the aminooxyarsenobenzenes, and which, moreover, present the advantage over the latter that they are soluble in diluted solution of sodium carbonate, so that the use of the caustic alkali, required in the preparation of solutions of diaminodioxyarsenobenzene for injections, is avoided, and therefore also the extremely irritating action produced by the caustic alkali.

Example I: 115 grams of 3.4-aminophenol-1-arsinic acid are dissolved in one liter of water and 260 cc. of double normal caustic soda lye; there are then introduced at ordinary temperature, while well stirring, 100 cc. of acetic acid anhydrid and, as soon as crystals begin to separate, 390 cc. of hydrochloric acid (of specific gravity 1.12) are added. The acetaminophenolarsinic acid then separating is filtered off, washed with water to remove the hydrochloric acid, and dried. 68.8 grams of the said acetaminophenolarsinic acid are then dissolved in 1400 cc. of water and 145 cc. of double normal caustic soda lye and introduced into a solution of 690 grams of anhydrous sodium hydrosulfite and 140 grams of crystalline magnesium chlorid dissolved in 3450 cc. of water. By digesting now the mixture at 50° C., the diacetamino-dioxy-arsenobenzene is separated in the form of a light-yellow, micro-crystalline precipitate. The product is then filtered, thoroughly washed with water and dried in a vacuum over sulfuric acid. It is, unlike the non-acetylated product, readily soluble even in sodium carbonate, insoluble in diluted acids, also readily soluble in acetone, more difficultly soluble in alcohol, insoluble in ether, hydrocarbons and water. It melts at about 200° C.

Example II: Into a solution of 115 grams of 3.4-aminooxybenzenearsinic acid in one liter of water and 260 cc. of double normal caustic soda lye are introduced, while well stirring, 55 grams of chlorocarbonate of ethyl. The oily drops of the latter disappear and the new product begins to crystallize; whereupon 195 cc. of hydrochloric acid (of specific gravity 1.12) are added; the mass is then stirred for some time, the separated oxyphenyl-urethane-arsinic acid filtered and washed with water and the whole dried. The reduction may be effected as indicated in Example I, whereby the arsenooxyphenyl-urethane is obtained in the form of a light-yellow, micro-crystalline powder, insoluble in aqueous acids, ether and benzene, soluble in acetone and alcohol, readily soluble in alkalis and sodium carbonate, yielding, on heating with hydrochloric acid 3.3¹-diaminodioxyarsenobenzene. It has the formula:

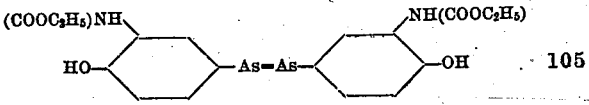

Example III: A solution of 116.5 grams of amino-phenolarsinic acid in 750 cc. of water and 250 cc. of double normal caustic soda lye are mixed in succession with 120 grams of potassium cyanate and 120 cc. of glacial acetic acid, and this mixture is allowed to stand for 12 hours. From the filtered solution the oxy-phenyl-urea-arsinic acid can be precipitated by adding hydrochloric acid. The reduction may be effected as indicated in Example I, whereby the dicarbamido-dioxy-arsenobenzene is obtained in the form of a sulfur-colored powder, readily soluble in sodium-carbonate, soluble in acetone and alcohol, insoluble in ether, water and aqueous acids; it has no exact melting point and decomposes at a temperature over 200° C.

Having now described our invention, what we claim is:

1. The process of preparing derivatives of the acidylaminooxyarsenobenzene, which consists in treating an acidylaminooxyphenyl-arsinic acid with a reducing agent.

2. As new products, the di-(acidylamino) dioxyarsenobenzenes, containing a radical of the formula:

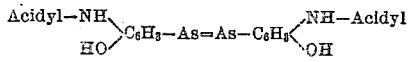

being yellow powders, insoluble in ether, benzene and diluted acids, soluble in acetone, alcohol, alkalis and sodium carbonate, splitting up, when heated with diluted acids, with production of diaminodioxyarsenobenzenes.

3. As a new product, the 3.3¹-urethane-4.4¹-dioxyarsenobenzene of the constitution:

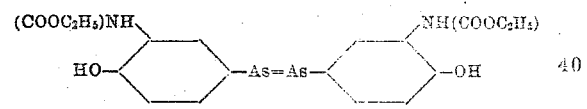

being a light yellow, crystalline powder, insoluble in ether and benzene and also in diluted hydrochloric acid, soluble in acetone and alcohol, also readily soluble in alkalis and sodium carbonate, yielding, on heating with hydrochloric acid 3.3¹-diaminodioxyarsenobenzene.

In testimony whereof, we affix our signatures in presence of two witnesses.

PAUL EHRLICH.
ALFRED BERTHEIM.

Witnesses:
   JEAN GRUND,
   CARL GRUND.